United States Patent
Curuvija et al.

(10) Patent No.: US 10,773,601 B2
(45) Date of Patent: Sep. 15, 2020

(54) INTEGRATED PRECHARGING AND DISCHARGING FOR ELECTRIC VEHICLE DRIVE SYSTEM CAPACITORS

(71) Applicant: FORD GLOBAL TECHNOLOGIES, LLC, Dearborn, MI (US)

(72) Inventors: Boris Curuvija, West Bloomfield, MI (US); Fan Xu, Novi, MI (US); Lihua Chen, Farmington Hills, MI (US); Baoming Ge, Okemos, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 166 days.

(21) Appl. No.: 16/163,736

(22) Filed: Oct. 18, 2018

(65) Prior Publication Data

US 2020/0122582 A1   Apr. 23, 2020

(51) Int. Cl.
*B60L 50/40* (2019.01)
*B60L 3/00* (2019.01)
*H02M 1/32* (2007.01)
*H02H 7/122* (2006.01)
*H02M 7/5387* (2007.01)

(52) U.S. Cl.
CPC ............... *B60L 50/40* (2019.02); *B60L 3/003* (2013.01); *H02H 7/1222* (2013.01); *H02M 1/32* (2013.01); *H02M 7/53871* (2013.01); *H02M 2001/322* (2013.01)

(58) Field of Classification Search
CPC ....... B60L 50/40; B60L 3/003; H02H 7/1222; H02M 1/32; H02M 7/53871; H02M 2001/322
See application file for complete search history.

(56) References Cited

U.S. PATENT DOCUMENTS

| | | | |
|---|---|---|---|
| 9,656,556 B2 | 5/2017 | Syed et al. | |
| 9,991,814 B2 | 6/2018 | Bae et al. | |
| 10,035,422 B2 | 7/2018 | Zhou et al. | |
| 2018/0065489 A1 | 3/2018 | Zhou et al. | |

FOREIGN PATENT DOCUMENTS

| | | |
|---|---|---|
| CN | 104393586 A | 3/2015 |
| CN | 104626995 A | 5/2015 |
| KR | 100802679 B1 | 2/2008 |

*Primary Examiner* — Robert L Deberadinis
(74) *Attorney, Agent, or Firm* — David B. Kelley; MacMillan, Sobanski & Todd, LLC

(57) ABSTRACT

A shared resistor performs precharging and discharging functions of capacitors in an electric vehicle drive system. In a precharge state, the shared resistor is connected between the capacitors and a DC source via a precharge relay. In a discharge state, the resistor is connected across the capacitors via a discharge transistor. Otherwise, the resistor is disconnected. A bypass switch is connected between the resistor and an input capacitor. The bypass switch is rendered conductive during the precharge state and during the discharge state. The discharge transistor is activated only during the discharge state. As a result, the invention uses less components by virtue of eliminating separate resistance elements for pre-charging and discharging and by eliminating discharge switches dedicated to separate resistances. The circuit integration and the placement of components outside the inverter module improves overall system cost and packaging size.

11 Claims, 5 Drawing Sheets

INTEGRATED PRECHARGING AND DISCHARGING FOR ELECTRIC VEHICLE DRIVE SYSTEM CAPACITORS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to drive systems for electric vehicles, and, more specifically, to circuitry for combining the functions of precharging of a capacitor upon energizing of the electric drive and discharging the capacitor upon deactivation of the electric drive.

Electric vehicles, such as hybrid electric vehicles (HEVs), plug-in hybrid electric vehicles (PHEVs), and battery electric vehicles (BEVs), utilize inverter-driven electric machines to provide traction torque. A typical electric drive system may include a DC power source (such as a battery pack or a fuel cell) coupled by contactor switches (i.e., relays) to an input capacitor for buffering the battery voltage. A DC-DC converter (also known as a variable voltage converter, or VVC) couples the input capacitor to a main DC linking capacitor that supports a high voltage DC bus. The VVC may bi-directionally direct a current flow between the input capacitor and the linking capacitor to regulate a voltage across one of the capacitors. A three-phase motor inverter is connected between the main buses with outputs of the inverter connected to a traction motor in order to convert DC bus power to an AC voltage coupled to the windings of a traction motor in order to propel the vehicle. During deceleration of the vehicle, the motor can be driven by the vehicle wheels and used to deliver electrical power to charge the battery during regenerative braking of the vehicle, with the DC-DC converter working in the opposite direction to convert the generated power to a DC voltage appropriate for charging the battery pack. In some vehicles, a generator driven by an internal combustion (gasoline) engine is provided to generate electric power to charge the battery. A second three-phase inverter typically connects the generator output to the high voltage DC bus.

Due to the high voltages present when the electric drive is in use, special precautions are necessary during activation and deactivation of the drive. During activation, for example, the contactors are opened at a time when the capacitors are discharged at about zero Volts. Closing the contactors with the capacitors in a discharged or low charged state would present a low impedance to the battery pack, resulting in a very high inrush current that could cause damage to the contactors and other components. One solution is to provide a constant resistance between a contactor and the capacitors. However, use of a current-limiting resistor in series with the contactors is undesirable after the initial precharging because of the associated voltage drop and power consumption it would cause during subsequent normal operation. Therefore, a separate circuit branch, or precharging circuit, is often used. The known precharging circuits utilize a switch and a resistor in series between the DC supply and the capacitors. Turning on the switch allows the capacitors to be charged through the resistor, and the presence of the resistor limits the inrush current to prevent damage to the switch. Once the capacitors are precharged, then i) the main contactors can be closed without receiving any inrush current and ii) the precharge switch can be opened so that the precharge resistor is disconnected.

During deactivation, it becomes necessary to discharge the capacitors. A shutdown of the electric drive system can result from a vehicle key-off, a high-voltage DC interlock fault, or a vehicle crash, for example. During shutdown, the battery is quickly isolated from the rest of the electric system by opening the mechanical contactors. This also isolates the electric charges present on the DC capacitors. Due to safety requirements, the HV capacitor charges should be quickly discharged within a specific time. For example, U.S. Federal Motor Vehicle Safety Standards (FMVSS) may require that the voltage on the DC link capacitor must be less than 60V within 5 seconds in certain circumstances.

The simplest conventional methods for discharging the link capacitor use a resistance placed across the capacitor to dissipate the charge. The resistor placement can be passive or active. A passive discharge resistor (PDR) is hard-wired in parallel with the link capacitor. The passive resistor must have a relatively large resistance to avoid excessive power loss during normal operation. Consequently, it could take one to two minutes to dissipate an HV charge down to a safe level. To discharge more quickly, an active discharge circuit uses a resistor in series with a transistor switch so that the charge can be selectably dissipated through a smaller resistance value.

The circuit components for the active discharge circuits and at least some components for a precharge circuit are typically included on a printed circuit board in an Inverter System Controller (ISC) module. Thus, the size, component count, and cost of an ISC module are all increased. It would be desirable to perform the precharge and discharge functions with fewer components so that size and cost of an ISC module can be reduced.

SUMMARY OF THE INVENTION

In one aspect of the invention, an electric drive system for a vehicle with a DC source comprises a link capacitor between a positive bus and a negative bus. A precharge contactor has an input adapted to be connected to the DC source and has an output. A resistance element connects the precharge contactor output to the positive bus. A discharge switch selectably connects the negative bus to a junction between the precharge contactor and the resistance element. When the precharge contactor is conducting and the discharge switch nonconducting, then the capacitor is precharged. When the discharge switch is conducting, then the capacitor is discharged. The same resistance element carries both the precharging current and the discharging current of the capacitor.

In a preferred embodiment, the drive system has a link capacitor and an input capacitor. The input capacitor has positive and negative terminals selectably coupled to the DC source by positive and negative contactors, respectively. A voltage converter couples the positive terminal to the positive bus. A bypass switch selectably couples the positive terminal to the positive bus. In a precharge state, the precharge contactor and the bypass switch are conductive while the discharge switch and the positive contactor are nonconductive. In a discharge state, the discharge switch and the bypass switch are conductive while the precharge, positive, and negative contactors are nonconductive.

DETAILED DESCRIPTION OF PREFERRED EMBODIMENTS

Figure 1:
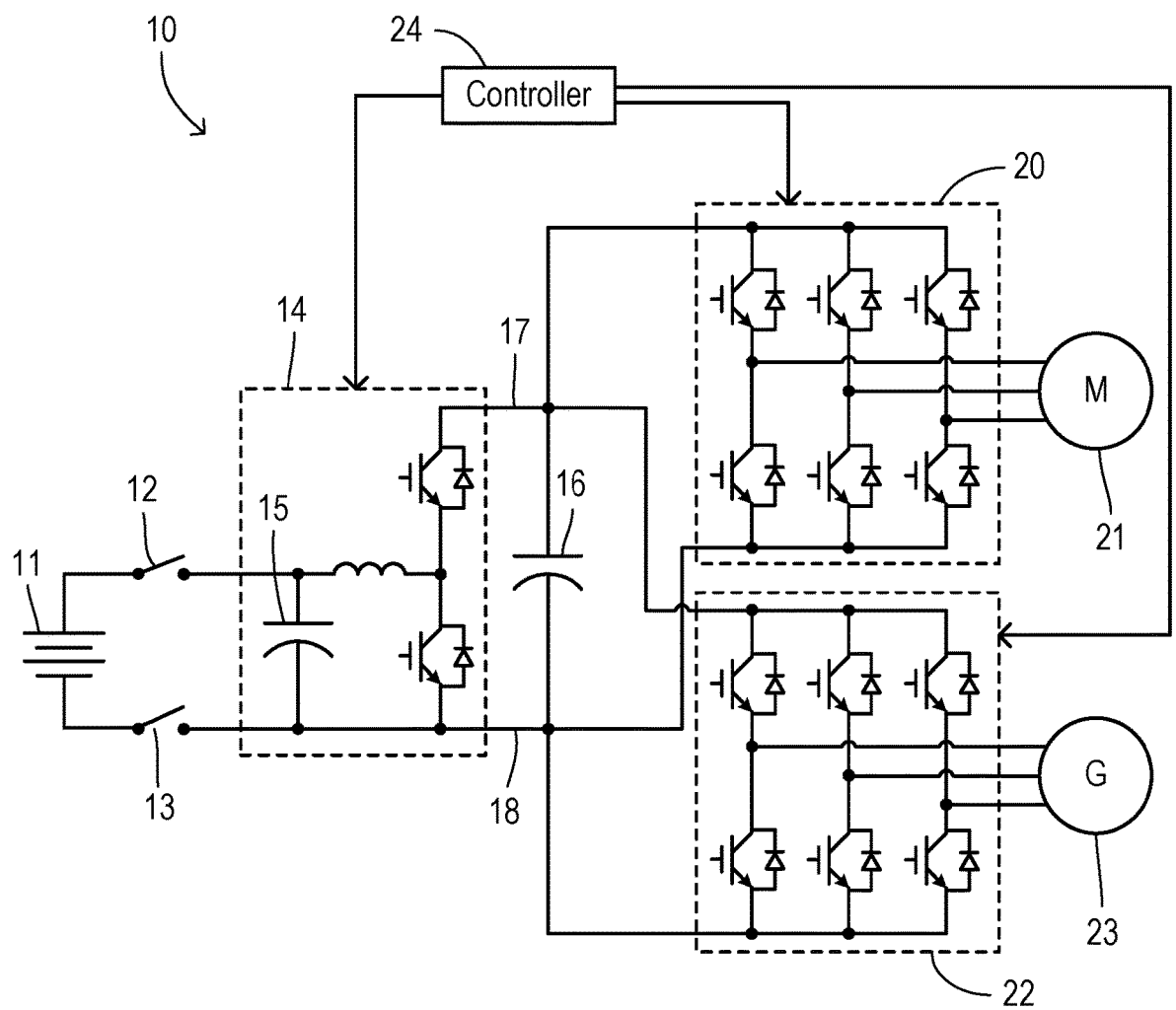
FIG. 1 is a schematic, block diagram showing an electric drive for a typical hybrid electric vehicle.

FIG. 1 illustrates an electric drive system 10 of a known type which is useful with a powersplit hybrid drive, for example. A battery pack 11 is coupled by contactor relay switches 12 and 13 to a variable voltage converter (VVC) 14 having input capacitor 15. A DC link capacitor 16 is connected to an output of VVC 14 establishing a positive bus 17 and a negative bus 18. A motor inverter 20 couples a traction motor 21 to the DC voltage between busses 17 and 18. Likewise, a generator inverter 22 couples an electrical generator 23 to the DC link. Inverters 20 and 22 are each comprised of a plurality of switching devices (such as insulated gate bipolar transistors, IGBTs) in a bridge configuration including three phase legs. The IGBTs inverters 20 and 22, as well as the IGBTs in VVC 14, are driven according to control signals (e.g., PWM switching signals) from a controller 24 in a conventional manner. Battery pack 11 may provide an output voltage of about 200V to 300V, while the DC link is normally operated at a higher voltage of about 600V to 800V, for example. Even though they are not usually at the same voltage, it is important to provide precharging and discharging for both capacitors.

Figure 2:
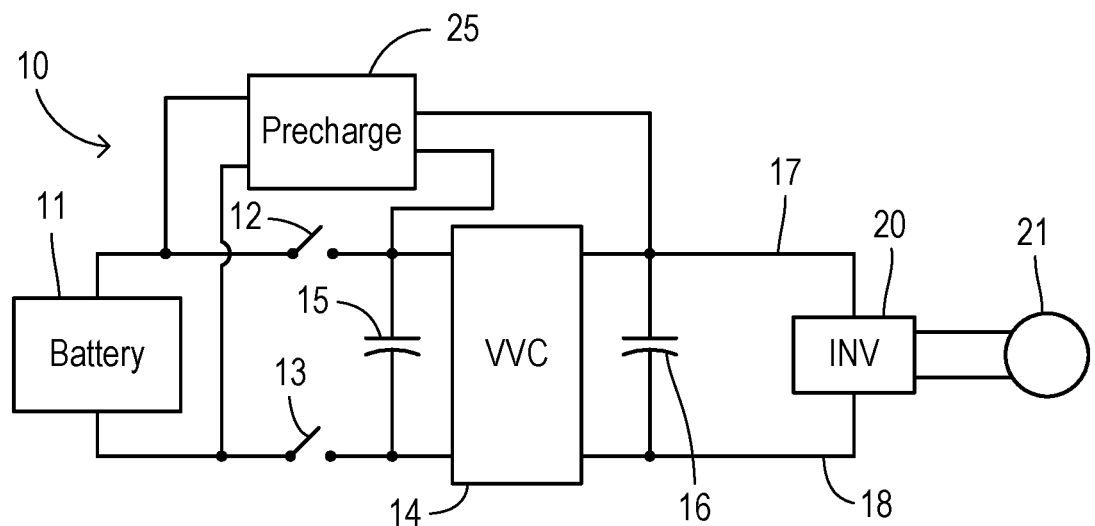
FIG. 2 is a schematic, block diagram showing the general arrangement of a prior art precharging circuit.

FIG. 2 illustrates a common arrangement for precharging applied to drive system 10. A precharge circuit 25 has an input coupled across battery pack 11 and an output connected to positive terminals of link capacitor 16 and input capacitor 15 in order to supply a charge onto the capacitors during startup of electric drive 10 so that when contactors 12 and 13 are closed, they are not damaged by an inrush current. After capacitors 15 and 16 are precharged to the voltage of battery pack 11, precharge circuit 25 is deactivated so that no power is lost during normal operation of drive system 10.

Figure 3:
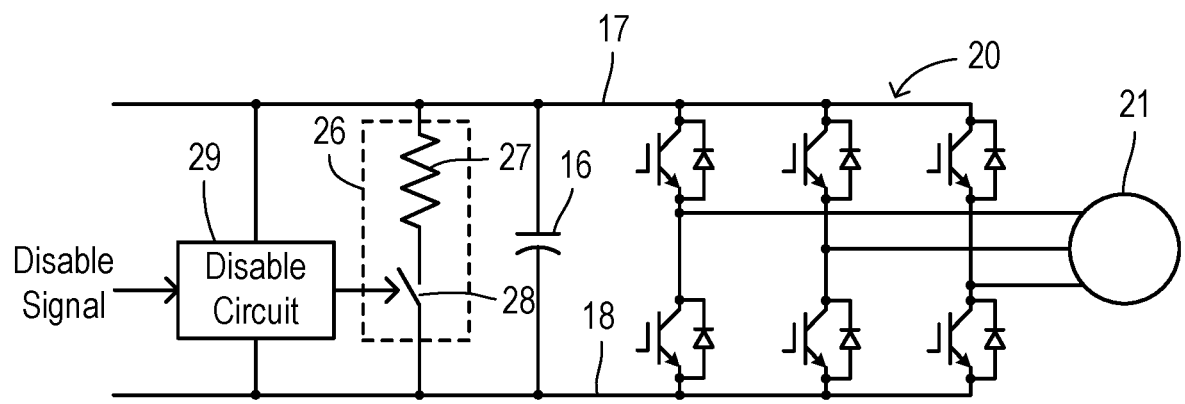
FIG. 3 is a schematic, block diagram showing the general arrangement of a prior art discharging circuit.

FIG. 3 shows a conventional arrangement for actively discharging link capacitor 16. A similar circuit can also be used for discharging input capacitor 15 (not shown). An active discharge circuit 26 has a discharge resistor 27 in series with a discharge switch (e.g., transistor) 28. Switch 28 has a control terminal for selectably turning the discharge switch on and off via a disable circuit 29 in response to a disable command signal from a controller (not shown). The controller may be comprised of a conventional Motor Generator Control Unit (MGCU) as known in the art. The function of disable circuit 29 is to perform a logical inversion of the disable command signal. Thus, when the disable command signal has a high logic level, an output of disable circuit 29 connected to the control terminal has a low voltage level so that switch 28 is turned off (and capacitor 16 is not discharged). The low voltage level can be obtained by shunting the control terminal to negative bus 18, for example. When the disable command signal ceases (i.e., drops to a low logic level), the output of disable circuit 29 is automatically pulled up to a voltage sufficient to turn on discharge switch 28 and capacitor 16 is quickly discharged. In the event of a failure of the control unit, any command signals may be lost. Disable circuit 29 logically inverts command signal so that if there is a loss of command signals due to failure of the control unit then capacitor 16 is discharged. Therefore, protection against a high voltage on capacitor 16 is obtained even when the control unit fails.

Figure 4:
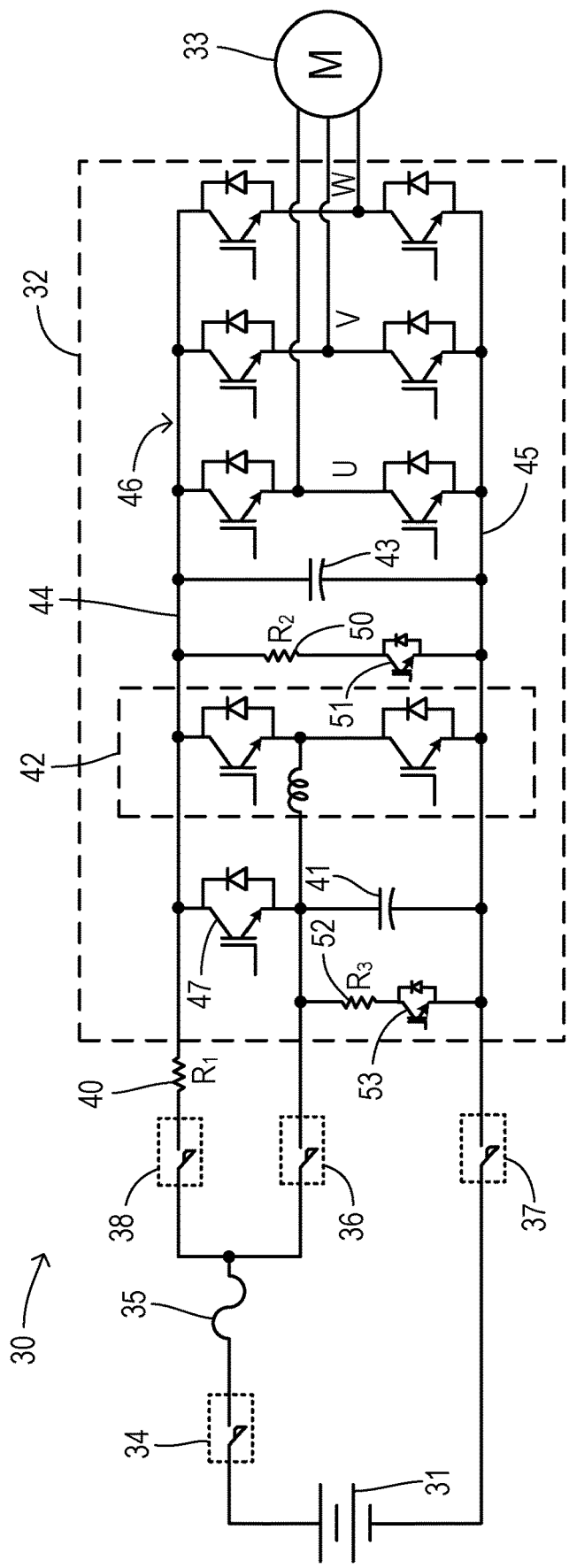
FIG. 4 is a schematic diagram of a portion of a prior art electric drive showing precharging and discharging circuits in greater detail.

FIG. 4 illustrates an electric drive system 30 providing both precharging and discharging of capacitors using the known techniques. Electric drive 30 includes a battery pack 31 connected to an inverter system controller (ISC) module 32 for driving a traction motor 33. External components interconnecting battery pack 31 with module 32 include a manual service disconnect (MSD) switch 34 and fuse 35 feeding DC power from battery pack 31 to main contactors (i.e., electronically-controlled relay switches) 36 and 37 and a precharge contactor 38. A precharge resistor 40 is shown as being external of module 32, but it could alternatively be mounted inside module 32.

Module 32 includes an input capacitor 41 arranged to receive battery voltage when main contactors 36 and 37 are closed. Battery voltage is provided to an input of a VVC 42 having its output connected across a DC link capacitor 43, creating a high-voltage rail between a positive bus 44 and a negative bus 45. The high-voltage DC is converted to AC by an inverter 46 for driving three-phase motor 33.

A bypass switch 47 is connected between capacitor 41 and positive bus 44 in order to bypass VVC 42 (e.g., when positive bus 44 is intended to operate at a voltage equal to battery voltage) as known in the art. Bypass switch 47 is also used during the precharge state of electric drive 30 as follows. Prior to entering the precharge state, main contactors 36 and 37 and precharge contactor 38 are open (nonconductive) and capacitors 41 and 43 are substantially discharged. To initiate precharging, precharge contactor 38 and main contactor 37 are closed (conductive) so that current flows through precharge resistor 40 in order to supply charging current directly to link capacitor 43. Simultaneously, bypass switch 47 is activated so that it conducts charging current to input capacitor 41. After sufficient charging, the voltages across capacitors 41 and 43 are substantially the same as the battery voltage. Precharge contactor 38 is then opened, and main contactors 36 is closed (contactor 37 is already closed during precharge and it remains closed). Drive circuit 30 is then ready for normal operation for driving motor 33 (and for transferring power from motor 33 back to battery pack 31 during regenerative braking).

For discharging capacitors 41 and 43 during a shutdown, active discharge circuits are provided which include a discharge resistor 50 and discharge switch 51 connected in series across capacitor 43 and a discharge resistor 52 and a discharge switch 53 connected in series across input capacitor 41. Discharge switches 51 and 53 may be comprised of IGBTs or MOSFETs, for example. When a controller (not shown) determines that a shutdown is required, it initiates a discharge state by opening main contactors 36 and 37. Then then controller renders discharge switches 51 and 53 conductive in order to dissipate charge from capacitors 41 and 43 in resistors 52 and 50, respectively. Although one resistor symbol is shown for each discharge resistors 50 and 52, each may include multiple resistor devices connected together to provide sufficient power dissipation capability.

The circuit in FIG. 4 demonstrates that known methods for pre-charging and discharging of the capacitors utilize a relatively large number of components, most of which have been mounted within the inverter module. This creates higher component costs and increases the overall size and complexity of the associated module.

Figure 5:
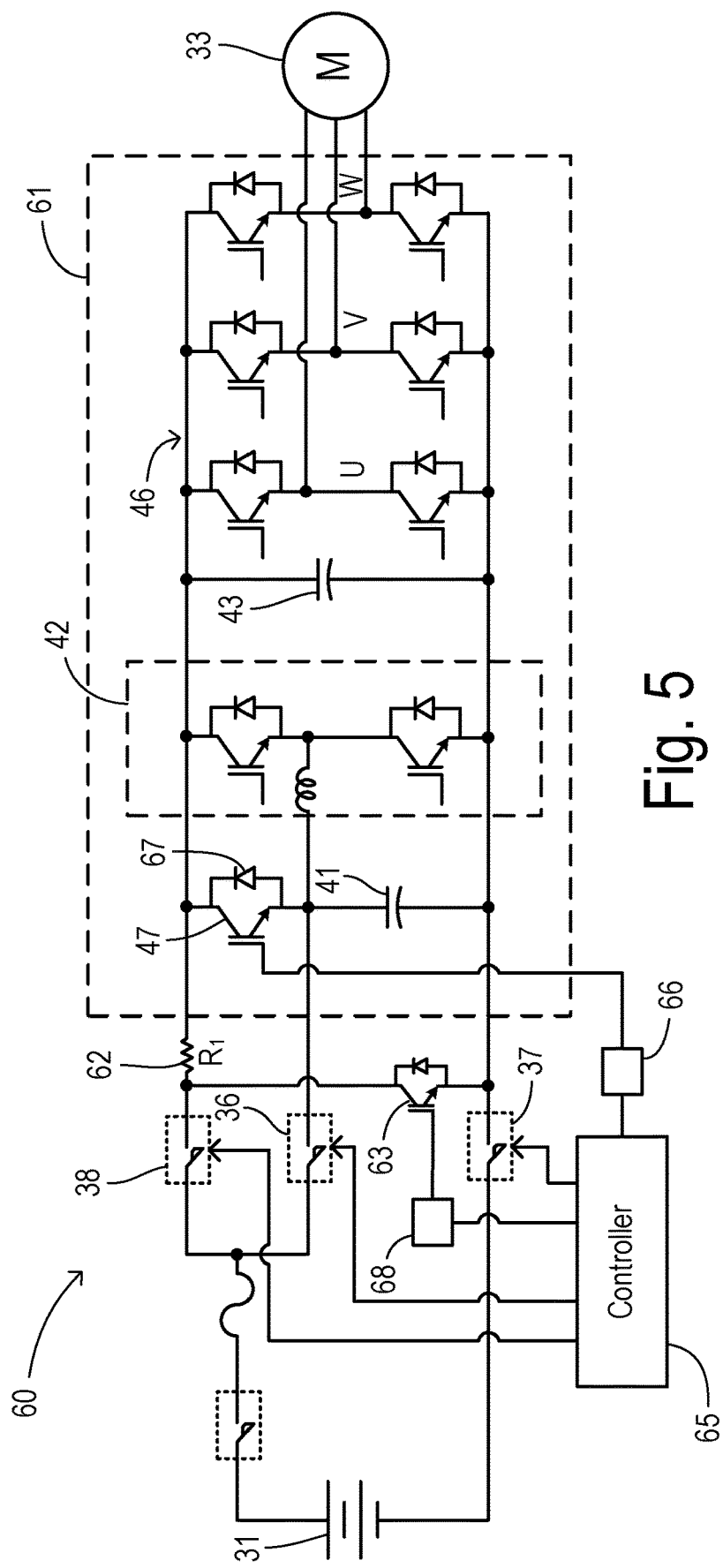
FIG. 5 is a schematic diagram showing a preferred embodiment of an integrated precharging/discharging circuit.

FIG. 5 shows an electric drive system 60 incorporating an integrated pre-charging and discharging circuit for a reduced component count and simplified inverter module. Elements of drive system 60 in FIG. 5 which are identical to components of FIG. 4 are indicated using the same reference numbers. Input capacitor 41 and DC link capacitor 43 receive DC power derived from battery pack 31 via main contactor relays 36 and 38 and via VVC 42. An inverter system controller module 61 is constructed without any internal active discharge system circuit components. A combined precharge/discharge resistance element 62 connects precharge contactor 38 to positive bus 44. Resistance element 62 preferably includes one or more fixed resistors to providing a resistance value and a power dissipation capacity that achieves desired charging and discharging rates. Other types of resistance elements can be utilized such as a FET driven in its transition zone.

The integrated precharge/discharge circuit of drive system 60 further includes a discharge switch 63 that selectively connects a junction between precharge contactor 38 and resistor 62 with negative bus 45. A controller 65 is configured to provide control signals to contactors 36, 37, and 38 and to provide command signals to transistor driver circuits 66 and 68 for controlling bypass switch 47 and discharge switch 63, respectively. In the illustrated embodiment, bypass switch 47 is shown as an IGBT with a bypass diode 67. Diode 67 alleviates the need for activating the IGBT during discharge of the input capacitor 41 as described below. In the event that a bypass diode was not present, then it would become necessary to provide a drive command signal to activate bypass switch 47 during discharging of capacitor 41.

Figure 6:
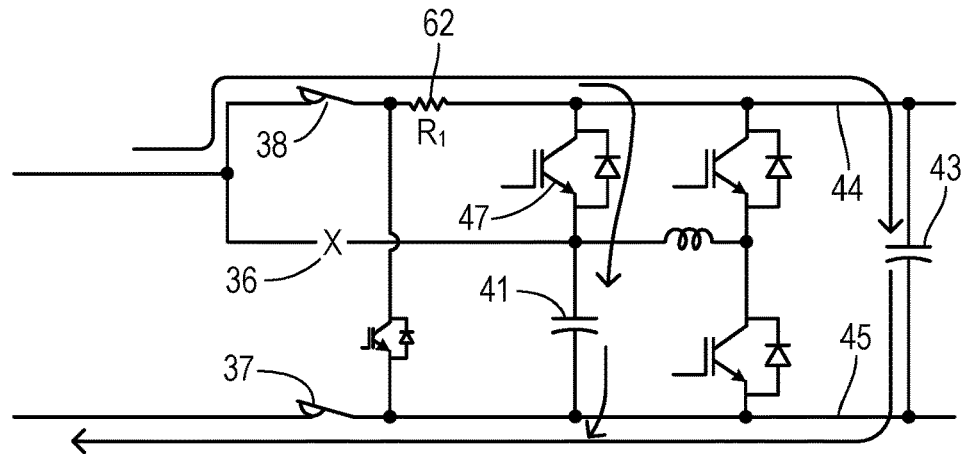
FIG. 6 is a schematic diagram showing a flow of precharging current during a precharge state of the circuit of FIG. 5.
Figure 7:
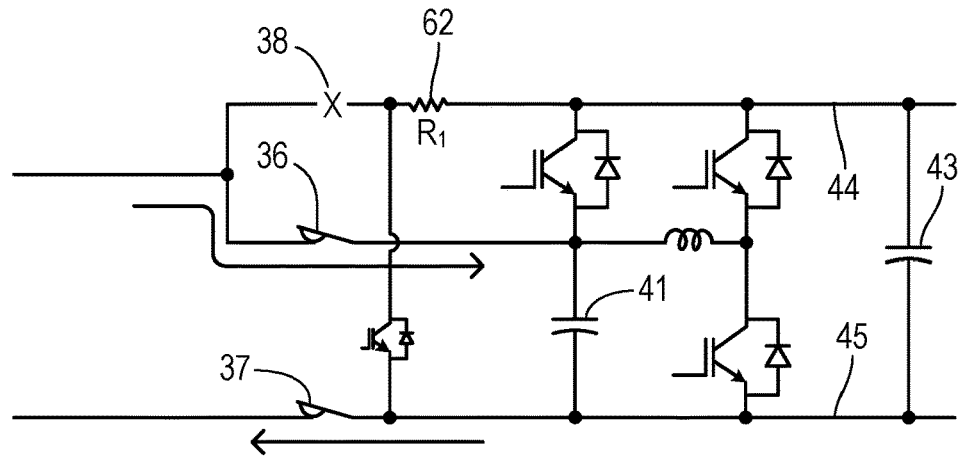
FIG. 7 is a schematic diagram showing a flow of normal operating current during routine operation of the circuit of FIG. 5.

When controller 65 determines that the drive system is being activated from an inactive state, then it triggers a precharge state. Prior to the precharge state, contactors 36, 37, and 38 are all nonconductive and capacitors 41 and 43 are substantially discharged. To begin the precharge state controller 65 renders precharge contactor 38, main contactor 37, and bypass switch 47 conductive, which results in a current flow as illustrated in FIG. 6. Current flows through resistance element 62 to positive bus 44 thereby charging link capacitor 43 directly. Current also flows from resistance element 62 to input capacitor 41 via bypass switch 47. Controller 65 typically monitors a voltage on the DC link using a sensor (not shown). Once the DC link voltage reaches a level substantially equal to the battery voltage, then precharge contactor 38 is opened, thereby disconnecting resistance element 62 from the DC power. Bypass switch 47 is rendered nonconductive and main contactor 36 is closed, so that drive 60 is ready to provide normal operating current flow as shown in FIG. 7.

Figure 8:
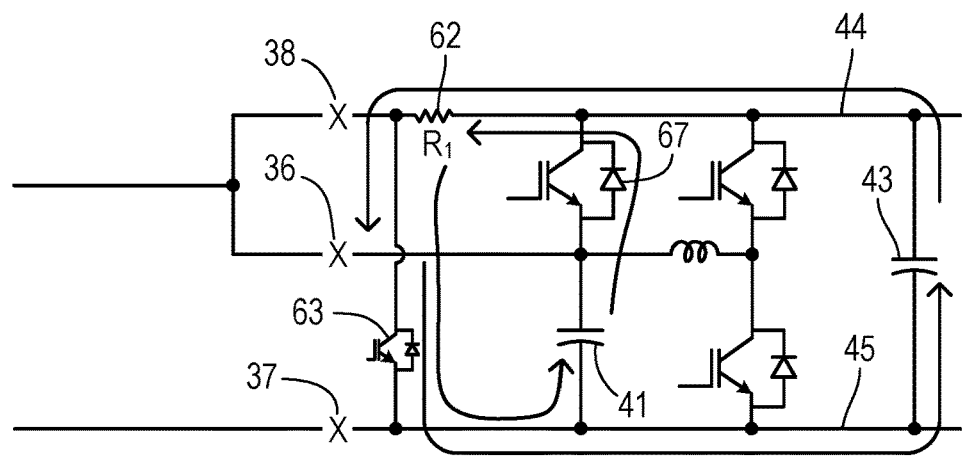
FIG. 8 is a schematic diagram showing a flow of discharging current during a discharge state of the circuit of FIG. 5.

When inverter operation is commanded to shut down, controller 65 opens main contactors 36 and 37 to isolate battery pack 31 and then initiates a discharge state. In order to discharge capacitors 41 and 43, controller 65 renders discharge switch 63 conductive via a command signal provided to driver circuit 68. Driver circuit 68 converts the command signal to an appropriate current and voltage for driving the transistor of discharge switch 63 (e.g., utilizing the disable logic as shown in FIG. 2). As shown in FIG. 8, once discharge switch 63 is rendered conductive, discharge current flows from link capacitor 43 through resistance element 62 and discharge switch 63. Another discharge current flows from input capacitor 41 through bypass diode 67, resistance element 62, and discharge switch 63. DC link capacitor 43 typically has a higher voltage which causes it to discharge first through resistance element 62. Once link capacitor 43 has discharged sufficiently to allow forward biasing of diode 67 then input capacitor 41 also begins to discharge. After the charges on capacitors 41 and 43 have depleted to a safe level, discharge switch 63 may be turned off by controller 65.

The foregoing invention is able to use a common resistance for performing the charging and discharging functions. In a precharge state, the common resistance element is connected between each of the capacitors and a DC source via a precharge relay. In a discharge state, the resistance element is connected across each capacitor via a discharge transistor. Otherwise, the resistance element is disconnected. A bypass switch is connected between the resistance element and the input capacitor. The bypass switch is rendered conductive during the precharge state and during the discharge state. The discharge transistor is activated only during the discharge state. As a result, the invention uses less components by virtue of eliminating separate resistance elements for pre-charging and discharging and by eliminating discharge switches dedicated to separate resistances. The circuit integration and the placement of components outside the inverter module improves overall system cost and packaging size.

What is claimed is:

1. An electric drive system for a vehicle with a DC source, comprising:
    a link capacitor between a positive bus and a negative bus;
    a precharge contactor having an input adapted to be connected to the DC source and having an output;
    a resistance element connecting the precharge contactor output to the positive bus; and
    a discharge switch selectably connecting the negative bus to a junction between the precharge contactor and the resistance element.

2. The drive system of claim 1 wherein the resistance element is comprised of a fixed resistor.

3. The drive system of claim 1 further comprising:
    an input capacitor with positive and negative terminals selectably coupled to the DC source by positive and negative contactors, respectively;
    a variable voltage converter coupling the positive terminal to the positive bus; and
    a bypass switch selectably coupling the positive terminal to the positive bus; wherein in a precharge state, the precharge contactor and the bypass switch are conductive while the discharge switch and the positive contactor are nonconductive; and
    wherein in a discharge state, the discharge switch and the bypass switch are conductive while the precharge, positive, and negative contactors are nonconductive.

4. The drive system of claim 3 further comprising:
an inverter bridge coupled to the variable voltage converter;
wherein the link capacitor, input capacitor, variable voltage converter, bypass switch, and inverter bridge are within an integrated inverter module; and
wherein the resistance element and the discharge switch are external to the inverter module.

5. The drive system of claim 3 wherein the bypass switch is comprised of an insulated gate bipolar transistor (IGBT) with a bypass diode, and wherein in the discharge state the bypass switch conducts via the bypass diode.

6. The drive system of claim 3 further comprising a control circuit detecting conditions for evoking the precharge state and the discharge state, wherein the control circuit accordingly activates the precharge contactor, the discharge switch, and the bypass switch.

7. The drive system of claim 6 wherein the discharge switch and the bypass switch are each comprised of an insulated gate bipolar transistor (IGBT), and wherein the drive system further comprises:
drive circuitry between the control circuit and the discharge switch and between the control circuit and the bypass switch adapted to convert respective command signals from the control circuit to drive signals adapted to obtain respective conductive and nonconductive states of the discharge switch and the bypass switch.

8. The drive system of claim 1 wherein the discharge switch is comprised of an insulated gate bipolar transistor (IGBT).

9. A method of precharging and discharging a link capacitor and an input capacitor in an electric vehicle drive, comprising:
in a precharge state, connecting a resistance element between each of the capacitors and a DC source via a precharge relay;
in a discharge state, connecting the resistance element across each capacitor via a discharge transistor; and
otherwise disconnecting the resistance element.

10. The method of claim 9 wherein a bypass switch is connected between the resistance element and the input capacitor, the method further comprising:
rendering the bypass switch conductive during the precharge state and during the discharge state.

11. The method of claim 9 wherein the discharge transistor is activated only during the discharge state.

* * * * *